United States Patent [19]

Bacvarov et al.

[11] 4,018,978

[45] Apr. 19, 1977

[54] ORBITAL DISC INSULATOR FOR SF$_6$ GAS-INSULATED BUS

[75] Inventors: Dosio C. Bacvarov, Greensburg; Nicholas G. Gomarac, West Newton, both of Pa.

[73] Assignee: I-T-E Imperial Corporation, Spring House, Pa.

[22] Filed: Feb. 25, 1976

[21] Appl. No.: 661,174

[52] U.S. Cl. .............................. 174/28; 174/16 B; 174/167

[51] Int. Cl.² ...................... H01B 9/04; H01B 17/58

[58] Field of Search .......... 174/28, 29, 16 B, 99 R, 174/99 B, 111, 138, 167, 174, 212

[56] References Cited

UNITED STATES PATENTS

| | | | |
|---|---|---|---|
| 2,123,209 | 7/1938 | Rost | 174/28 X |
| 2,198,405 | 4/1940 | Cords | 174/28 |
| 2,224,484 | 12/1940 | Morrow | 174/28 |
| 2,330,381 | 9/1943 | Quayle | 174/28 |
| 2,480,106 | 8/1949 | Baguley | 174/28 |
| 3,121,136 | 2/1964 | Mildner | 174/28 |
| 3,296,688 | 1/1967 | Hervig | 174/28 X |
| 3,361,866 | 1/1968 | Babigan | 174/28 |
| 3,569,875 | 3/1971 | Rainwater | 174/28 X |
| 3,751,578 | 8/1973 | Hoffman | 174/16 B X |
| 3,775,550 | 11/1973 | Olsen | 174/16 B X |

FOREIGN PATENTS OR APPLICATIONS

| | | | |
|---|---|---|---|
| 1,359,597 | 3/1964 | France | 174/28 |
| 652,441 | 10/1937 | Germany | 174/28 |
| 1,540,515 | 1/1970 | Germany | 174/28 |
| 1,068,970 | 5/1967 | United Kingdom | 174/28 |
| 1,073,606 | 6/1967 | United Kingdom | 174/28 |

*Primary Examiner*—Arthur T. Grimley
*Attorney, Agent, or Firm*—Ostrolenk, Faber, Gerb & Soffen

[57] ABSTRACT

An insulator for supporting a high voltage conductor within a gas-filled grounded housing consists of radially spaced insulation rings fitted to the exterior of the bus and the interior of the grounded housing respectively, and the spaced rings are connected by trefoil type rings which are integrally formed with the spaced insulation rings.

24 Claims, 2 Drawing Figures

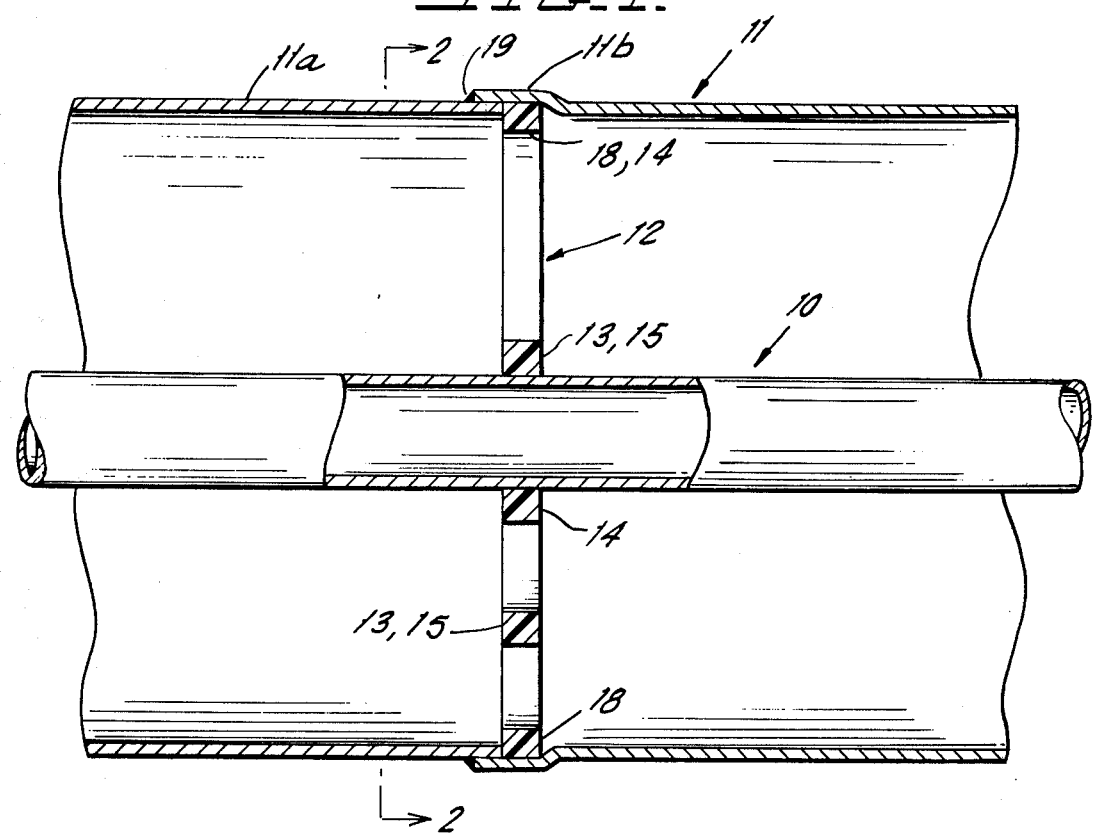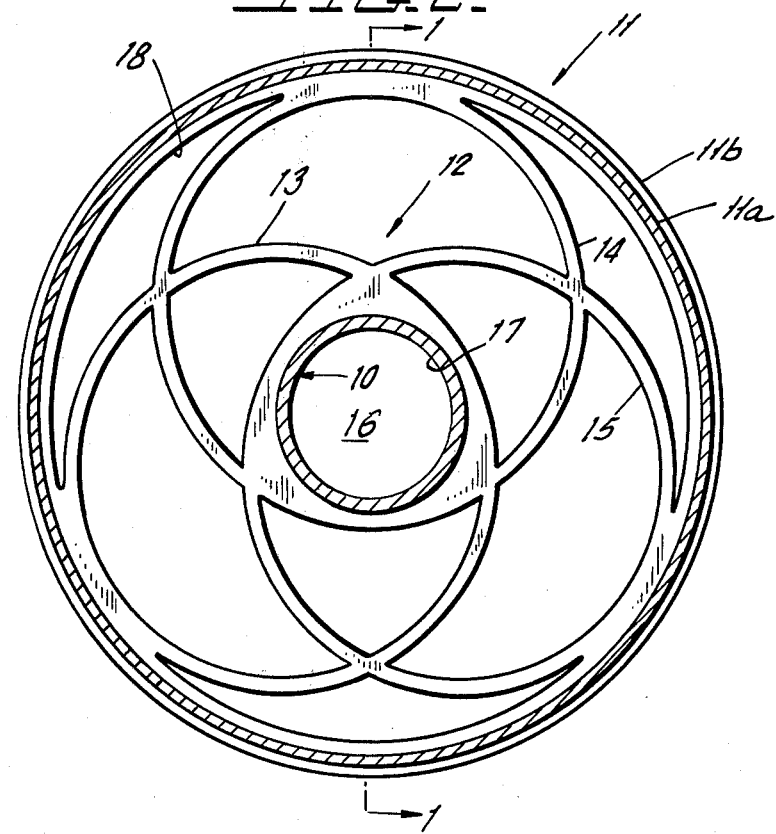

ORBITAL DISC INSULATOR FOR SF$_6$ GAS-INSULATED BUS

BACKGROUND OF THE INVENTION

This invention relates to high-voltage gas-insulated power transmission systems, and more specifically relates to a novel insulator for supporting the central elongated conducting bus within the interior of a gas-filled grounded conductive cylindrical housing.

A typical gas-insulated system involves a coaxial geometry in which a cylindrical conductor is located coaxially inside a cylindrical enclosure. The conductor is supported by insulators, fabricated from solid dielectric, placed at discrete intervals along the system. The insulator may assume a variety of shapes such as disc, post, cone, or perforated disc and the optimum design depends on the particular application.

Typical support insulators of disc shape and of conical shape are shown in U.S. Pat. Nos. 3,813,475 in the name of Cronin and 3,639,671 in the name of Clark, each of which are assigned to the assignee of the present invention.

Prior art insulators experience a basic problem due to the presence of gas such as sulfur hexafluoride under about three atmospheres of pressure in the dielectric-stress series with a solid dielectric material, which leads to dielectric overstressing of the gas gap, with a consequent potential for flashover. For example, in a disc-type insulator, there will be very short gas gaps between the interior diameter of the insulator and the outer diameter of the conductor supported by the insulator since it is almost impossible to get a perfect fit of the insulator on the conductor. If the disc insulation material has a dielectric constant of 5, the stress in the short gas gap radially beneath the dielectric is five times the stress in the gas at regions removed from the insulator. This can lead to either a flashover along the surface of the disc or a puncture of the solid material.

The above problem is generally overcome by placing a metal insert in the inner diameter of the insulator to short circuit any gas gap to the central conductor, and eliminate any local stress concentration. However, making insulators with conductive inserts is difficult and contributes to the high cost of such insulators. All the problems experienced above for disc insulators were also experienced for conical isulators which, however, offer a longer creepage path than the disc-shaped insulator.

BRIEF DESCRIPTION OF THE INVENTION

In accordance with the present invention, a novel insulator having a general trefoil shape is provided. The insulator shape more specifically contains inner and outer concentric rings which are connected to one another by three intersecting ring-shaped sections having their centers at points located at the vertices of an equilateral triangle. The three ring-shaped sections each enclose the inner ring, and form at least a portion of the geometry of the inner ring. Similarly, the three intersecting rings form at least portions of the outer ring of the insulator. If desired, the entire insulator can be formed, simply of three mutually intersecting rings which are integral with one another, with the central insulator suspended within the area circumscribed by each of the three rings, and with the outer housing receiving the outer surfaces of the three rings. Preferably, however, an internal ring form and and outer ring form are integrally formed on the internal area bounded by the three intersecting rings, and on the outer area of the rings respectively. Note that all of the rings are preferably circular, but they may also have noncircular shapes.

The insulator is generally flat and is disposed perpendicular to the bus and the bus housing. Moreover, the insulator is preferably made of a single integral molding. As will be seen, the insulator may be molded of teflon, and does not require a conductive insert.

The insulator structure of the present invention has the following advantages:

1. The insulator of the invention has adequate mechanical strength with minimum amount of material. The supporting ribs are loaded mechanically on compression. The insulator is light and economical. For example, the weight of the insulator for a 345 kV system (18 inches enclosure I.D.) is 3.5 pounds.

2. The insulator of the invention has long creepage path along the insulator surface between the enclosure and the conductor. Even more important, the direction of the creepage path is off the direction of the electric field stress.

3. The insulator of the invention has reduced dielectric stress in the gap between the conductor and the enclosure due to the use of only a small amount of insulating material in series with the SF$_6$ gas.

4. The insulator of the invention eliminates the need for using a conducting insert.

5. The insulator shape of the invention permits the use of teflon for the insulator material. Teflon has a low dielectric constant (E = 1.8 – 2.2 depending upon type and manufacturer) and also exhibits good performance at high operating temperatures.

6. The proposed insulator allows ample gas passage for easy evacuation and pressurizing of the assembled bus.

7. The proposed insulator is not sensitive to contamination and improves its performance at high pressures. Therefore, it is appropriate for use in high pressure, high temperature, high dielectric stress systems.

BRIEF DESCRIPTION OF THE DRAWINGS

FIG. 1 is a cross-sectional view of a gas-insulated transmission system using the support insulator of the invention, and is a vertical cross-section through the axis of FIG. 2.

FIG. 2 is a cross-sectional view of FIG. 1 taken across the section line 2—2 in FIG. 1 and shows a front view of the generally trefoil shape of the insulator of the invention.

DETAILED DESCRIPTION OF THE DRAWINGS

Referring now to the drawings, there is shown a portion of a high voltage transmission system, of the type shown in U.S. Pat. No. 3,813,475, wherein a central power conducting bus 10, which may be of aluminum, is suspended within a conductive cylindrical grounded housing 11, which may also be of aluminum. The conductor 10 is supported within housing 11 by a plurality of space insulators, one of which is shown in FIGS. 1 and 2 as insulator 12. In a typical system, for transmission of voltage at 345 kV, the housing 11 might have a diameter of about 18 inches, bus 10 might have an outer diameter of about 8 inches. The housing 11 is sealed and filled with a suitable dielectric gas such as sulfur hexafluoride under pressure such as about three atmospheres.

The insulator 12 is shown in FIG. 2 is constructed in accordance with the invention and is molded from Teflon polytetraflouroethylene and has flat parallel surface and is about one inch thick. Preferably, all edges of the insulator 12 will be rounded.

The insulator 12 consists, essentially, of three intersecting rings 13, 14 and 15 having their axes at the vertices of an equilateral triangle and symmetrically disposed about the axis of conductor 10, and spaced 120° from one another around the axis of conductor 10. The bus 10 is then fitted into the area 16 bounded by the intersection of rings 13, 14 and 15.

In the embodiment shown, the molding further defines a center ring 17 which snugly fits around the entire periphery of conductor 10. Note that in assembling the insulator 12 on bus 10 the insulator will slide over the bus end and along its length until the desired axial location is reached. Thus, the fit between ring 17 and bus 10 must allow this sliding action to take place.

The outer periphery of rings 13, 14 and 15 in FIG. 2 is bounded by a further outer ring 18 which serves to fit within the interior surface of housing 11. In the embodiment shown, the housing is formed with a bell and spigot configuration so that the insulator 12 is clamped between the end of housing portion 11a, and the overlapping housing portion 11b as best shown in FIG. 1. Housing portions 11a and 11b may then be welded together as by weld bead 19 shown in FIG. 1. Note that any desired arrangement can be used to fix insulator 12 with respect to housing 11.

As can be seen from FIGS. 1 and 2, the insulator 12 provides considerable mechanical strength for a minimum amount of material, and is light and economical. The insulator further provides a long creepage path between bus 10 and enclosure 11 and the direction of the dielectric stress in the creepage path is not the direction of the radial electric field stress. The novel insulator also places only a small amount of solid dielectric material in series with the $SF_6$ gas, and eliminates the need for a conducting insert. The novel insulator also allows the use of teflon for the insulating material, rather than the previously used epoxy systems. It will be apparent that the novel insulator permits gas flow along the bus housing length, and is less sensitive to contamination problems.

Although the present invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or promperty is claimed are defined as follows:

1. A support insulator for a high-voltage gas-insulated power transmission system having a central conductor supported within a gas-filled housing; said support insulator comprising at least first, second and third rings of insulation material which mutually intersect one another and which define a central opening bound by each of said rings and outer periphery regions; whereby the central conductor of said power transmission system can be supported within said central opening, and whereby said outer periphery regions of said rings can engage the interior surface of said gas-filled housing to support said central conductor within said housing.

2. The support insulator of claim 1 wherein said first, second and third rings are circles of the same diameter.

3. The support insulator of claim 1 wherein the centers of said rings are symmetrically disposed around the central axis of said insulator.

4. The support insulator of claim 1 wherein said insulator is a flat member having parallel opposite surfaces.

5. The support insulator of claim 2 wherein the centers of said rings are symmetrically disposed around the central axis of said insulator.

6. The support insulator of claim 5 wherein said insulator is a flat member having parallel opposite surfaces.

7. The support insulator of claim 1 which further includes concentric inner and outer rings encircling said central opening and said outer periphery regions to define fully circular central and outer regions for said insulator.

8. The support insulator of claim 5 which further includes concentric inner and outer rings encircling said central opening and said outer periphery regions to define fully circular central and outer regions for said insulator.

9. The support insulator of claim 6 which further includes concentric inner and outer rings encircling said central opening and said outer periphery regions to define fully circular central and outer regions for said insulator.

10. The support insulator of claim 1 wherein each of said rings are integrally formed with one another.

11. The support insulator of claim 7 wherein each of said rings are integrally formed with one another.

12. The support insulator of claim 9 wherein each of said rings are integrally formed with one another.

13. The support insulator of claim 10 wherein said insulator is formed of polytetraflouroethylene.

14. The support insulator of claim 11 wherein said insulator is formed of polytetraflouroethylene.

15. The support insulator of claim 14 wherein said first, second and third rings are circles of the same diameter.

16. The support insulator of claim 15 wherein the centers of said rings are symmetrically disposed around the central axis of said insulator.

17. The support insulator of claim 16 wherein said insulator is a flat member having parallel opposite surfaces.

18. A high-voltage gas-insulated power transmission system comprising, in combination:
   an elongated central conductor;
   a gas-filled outer conductive housing for receiving and enclosing said elongated central conductor;
   and a support insulator for supporting said elongated central conductor within said gas-filled outer conductive housing; said support insulator comprising at least first, second and third rings of insulation material which mutually intersect one another and which define a central opening bound by each of said rings and outer periphery regions;
   said elongated central conductor being disposed within said central opening and being supported therein;
   said outer periphery regions of said rings engaging the interior of said outer conductive housing and being supported from said outer conductive housing.

19. The support insulator of claim 8 wherein said first, second and third rings are circles of the same diameter.

20. The support insulator of claim 19 wherein the centers of said rings are symmetrically disposed around the central axis of said insulator.

21. The support insulator of claim 20 wherein said insulator is a flat member having parallel opposite surfaces.

22. The support insulator of claim 21 which further includes concentric inner and outer rings encircling said central opening and said outer periphery regions to define fully circular central and outer regions for said insulator.

23. The support insulator of claim 22 wherein each of said rings are integrally formed with one another.

24. The support insulator of claim 23 wherein said insulator is formed of polytetraflouroethylene.

* * * * *